United States Patent
Das et al.

(10) Patent No.: US 11,328,503 B2
(45) Date of Patent: May 10, 2022

(54) WIRELESS DATA COMMUNICATION OF BINARY DATA AS IMAGE DATA

(71) Applicant: Hewlett-Packard Development Company, L.P., Houston, TX (US)

(72) Inventors: Sajal Kum Das, Bangalore (IN); Deb Rupam Banerjee, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 881 days.

(21) Appl. No.: 16/093,460

(22) PCT Filed: Jul. 14, 2016

(86) PCT No.: PCT/IN2016/050239
§ 371 (c)(1),
(2) Date: Oct. 12, 2018

(87) PCT Pub. No.: WO2018/011815
PCT Pub. Date: Jan. 18, 2018

(65) Prior Publication Data
US 2021/0194580 A1    Jun. 24, 2021

(51) Int. Cl.
*G06V 10/98* (2022.01)
*G06K 19/06* (2006.01)
*H04L 9/08* (2006.01)
*G06V 30/412* (2022.01)
*G06V 10/56* (2022.01)
*G06V 30/10* (2022.01)

(52) U.S. Cl.
CPC ......... *G06V 10/98* (2022.01); *G06K 19/0614* (2013.01); *G06V 10/56* (2022.01); *G06V 30/412* (2022.01); *H04L 9/0816* (2013.01); *G06V 30/10* (2022.01)

(58) Field of Classification Search
CPC .......... H04L 9/0816; H04B 10/11–116; G06V 10/98; G06V 10/56; G06V 30/412; G06V 30/10; G06K 19/0614
See application file for complete search history.

(56) References Cited

U.S. PATENT DOCUMENTS

| 5,793,880 A | 8/1998 | Constant |
| 8,866,836 B2 | 10/2014 | Lee et al. |

(Continued)

FOREIGN PATENT DOCUMENTS

| CN | 103310255 A | 9/2013 | |
| CN | 104298982 A | 1/2015 | |
| CN | 105680915 A * | 6/2016 | ........... H04B 5/0031 |

OTHER PUBLICATIONS

Katabi, Dina, et al., "Simple LCD Transmitter Camera Receiver Data Link", Jun. 15, 2009, 2 pages.

*Primary Examiner* — Casey L Kretzer
(74) *Attorney, Agent, or Firm* — Brooks Cameron & Huebsch PLLC

(57) ABSTRACT

Wireless data communication between two devices is described. In an example implementation, an image frame displayed on a display unit of a transmitting device is captured by a camera of a receiving device, where the image frame comprises text characters converted from binary data bits based on a text mapping table. The text characters in the captured image frame are converted to the binary data bits based on the text mapping table by the receiving device.

15 Claims, 8 Drawing Sheets

(56) References Cited

U.S. PATENT DOCUMENTS

| | | |
|---|---|---|
| 8,988,318 B2 | 3/2015 | Chupp |
| 9,124,756 B2 | 9/2015 | Kim |
| 2005/0254714 A1 | 11/2005 | Anne |
| 2010/0226588 A1 | 9/2010 | So et al. |
| 2010/0284611 A1 | 11/2010 | Lee et al. |
| 2013/0103726 A1* | 4/2013 | Tjin .................... G06F 16/972 707/827 |
| 2017/0033868 A1* | 2/2017 | Hong .................. H04B 10/116 |

* cited by examiner

WIRELESS DATA COMMUNICATION OF BINARY DATA AS IMAGE DATA

BACKGROUND

Devices, such as laptops, smartphones, tablets, printers, and the like, may store a variety of data which may be transferred or communicated to other devices. Devices employ various techniques for data communication. The data may be transferred into or out of a device wirelessly or through a wired connection.

BRIEF DESCRIPTION OF DRAWINGS

The following detailed description references the drawings, wherein.

DETAILED DESCRIPTION

Figure 1:
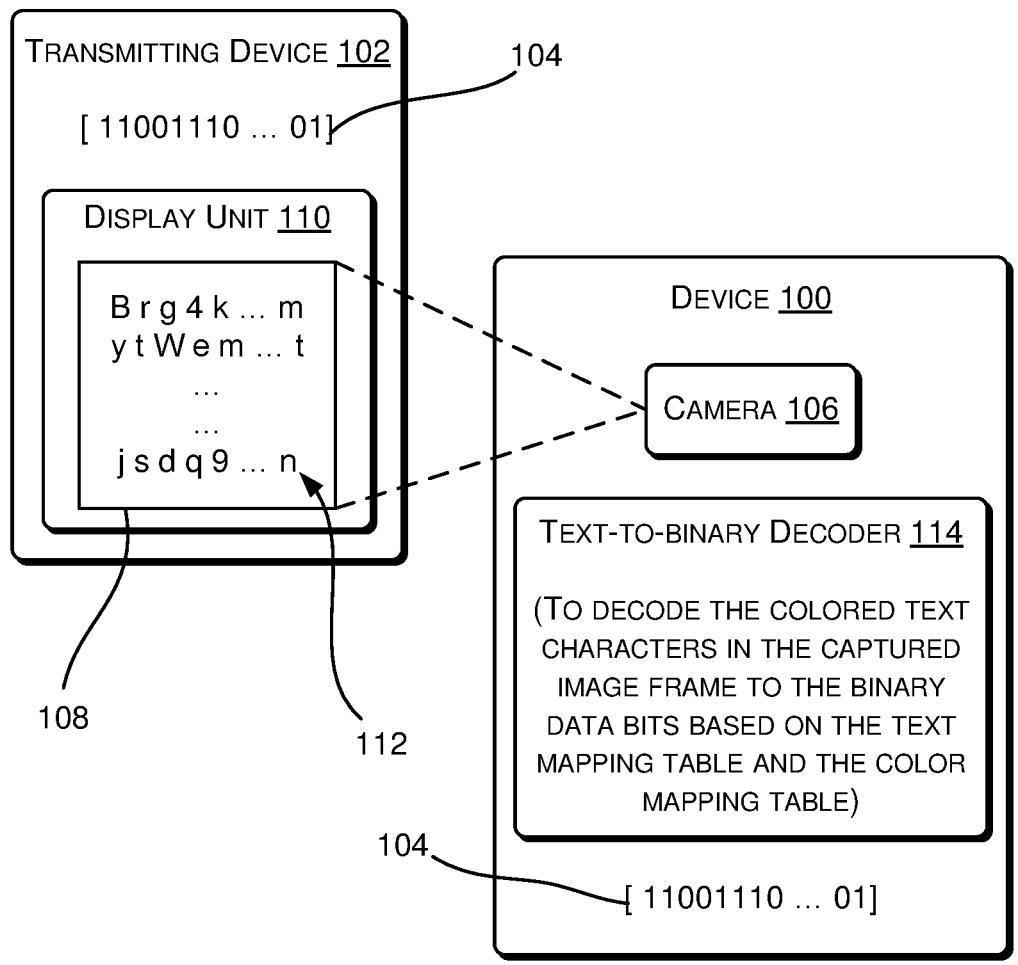
FIG. 1 illustrates a block diagram of a device for wireless data communication, according to an example of the present subject matter.

Devices store data in a binary format. The data may be associated with text files, image files, music files, video files, and such. Data in a device is communicated or transferred to another device through a wired or wireless communication channel. The device from which the data is transferred may be referred to as the transmitting device, and the device to which the data is transferred may be referred to as the receiving device.

For data communication over a wired communication channel, a serial data port, for example a universal serial bus (USB) port, may have to be available on each of the transmitting and receiving devices. Also, a compatible data cable has to be used to transfer data from the transmitting device to the receiving device. Data cannot be communicated over a wired communication channel in the absence of a compatible data cable, or if any of the transmitting device and the receiving device does not have a serial data port.

Data communication over a wireless communication channel may include WiFi, Bluetooth™, and infra-red (IR) radiation based communication. Such a data communication utilizes radio frequency (RF) or IR transmitters and receivers in the transmitting and receiving devices, respectively. Data cannot be wirelessly transferred in the absence of suitable transmitter and receiver in the respective devices. Also, the RF or IR transmitters and receivers add to the cost and complexity of the transmitting and receiving devices and make the devices bulky. Further, the RF or IR based data communication over a wireless communication channel, for example air, experiences excessive electrical/battery power loss in the devices, and high levels of signal interference and noise in the wireless communication channel.

The present subject matter describes approaches for wireless communication of data between devices. The present approaches are based on displaying and capturing images having text characters, which enable wireless communication of data in a simple and cost effective manner without using any RF or IR transmitter and receiver in the devices. The present approaches also facilitate wireless data communication at places and locations, such as hospitals and airplanes, where the RF or IR based data communication is restricted. With the present approaches of wireless communication of data, signal interference during the data communication may be eliminated, and power consumption for the data communication is less in comparison to that for RF or IR based data communication.

According to an example implementation of the present subject matter, in a transmitting device, binary data bits associated with the data to be transferred are converted to text characters in image frames. An image frame may correspond to a frame that can be displayed as an image on a display unit of the transmitting device. The binary data bits may be converted to text characters based on a text mapping table. The text mapping table may provide a mapping of different bit-patterns to different text characters, where a unique text character corresponds to a unique bit-pattern. The image frames generated in the transmitting device may be sequentially displayed on a display unit of the transmitting device for transferring the data to a receiving device.

While the image frames are displayed on the display unit of the transmitting device, a camera of the receiving device is positioned to face the display unit, and each of the image frames is captured by the camera of the receiving device. The text characters in the captured image frames are converted to the binary data bits in the receiving device. With this, the binary data bits are wirelessly transferred from the transmitting device to the receiving device. The text characters may be converted to the binary data bits based on the text mapping table in a manner opposite to the conversion in the transmitting device.

The text characters based image frames provide for simple, easy, and efficient conversion and capturing by the devices for data communication. The text characters may include any alpha-numeric characters, any symbolic characters, or a combination thereof. In an example implementation, the text characters may be 7-bit American Standard Code for Information Interchange (ASCII) characters, and the text mapping table may include mapping of 7 bit bit-patterns to ASCII characters.

In an example implementation, while converting the binary data bits to text characters in the transmitting device, the text characters may be color coded. The text characters may be color coded based on a color mapping table. The color mapping table may provide a mapping different bit-patterns to different colors, where a unique color corresponds to a unique bit-pattern. Upon capturing an image frame in the receiving device, the color of each of the text characters in the captured image frame is decoded along with the conversion to the binary data bits. The colors of the text characters may be converted binary data bits based on the color mapping table in a manner opposite to the coding in the transmitting device. Color coding of text characters enables packing of more data in each of the image frames, thereby increasing the rate of data communication between devices.

Further, in an example implementation, error-check text characters may be included in each line of the image frame for checking error in reception of the respective line. The error-check text characters in a line of an image frame may correspond to error encoding bits obtained based on the binary data bits in that line. In the receiving device, upon capturing an image frame, it is determined whether any lines of the captured image frame are received erroneously. A line is said to be erroneously received if the text characters, including the error-check text characters, in the received line are not same as the text characters in the transmitted line. A line may be determined to be erroneous by processing the error-check text characters in the line with respect to remaining text characters in the line. Upon determining the erroneously received lines, information of the erroneously received lines is provided to the transmitting device for retransmission of such lines. The information of a line may include an identifier, for example a line number, associated with the line. The erroneously received lines may accordingly be redisplayed on the display unit of the transmitting device. The text characters of the redisplayed lines may be captured by the camera of the receiving device and converted to binary data bits. The present subject matter thus provides a feedback mechanism from the receiving device to the transmitting device for retransmission of erroneously received lines of the image frames. The feedback mechanism facilitates complete and correct communication of data between the transmitting and receiving devices.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a device 100 for wireless data communication, according to an example of the present subject matter. The device 100, also referred to as a receiving device, may receive data from a transmitting device 102 through wireless data communication in accordance with the present subject matter. The device 100 and the transmitting device 102 may include laptops, smartphones, tablets, printers, and the like. The data to be transferred from the transmitting device 102 to the device 100 is in the form of binary data bits 104.

As shown, the device 100 includes a camera 106 to capture an image frame 108 displayed on a display unit 110 of the transmitting device 102. The image frame 108 has text characters 112 which are encoded from the binary data bits 104 in the transmitting device 102. The text characters may be alpha-numeric characters, symbolic characters, or a combination thereof. The binary data bits 104 in the transmitting device 102 are encoded into the text characters 112 based on a text mapping table. The text characters 112 may be color coded, based on a color mapping table. The text mapping table and the color mapping table may be stored in the transmitting device 102 for the purpose of encoding the binary data bits 104 to colored text characters.

The device 100 includes a text-to-binary decoder 114. Upon capturing the image frame 108 using the camera 106, the text-to-binary decoder 114 in the device 100 decodes the text characters 112 in the captured image frame to the binary data bits 104 based on the text mapping table. In case the text characters 112 are colored, the text-to-binary decoder 114 decodes the colored text characters based on the text mapping table and the color mapping table. The text mapping table and the color mapping table may also be stored in the device 100 for the purpose of decoding the text characters 112 to the binary data bits 104.

Figure 2:
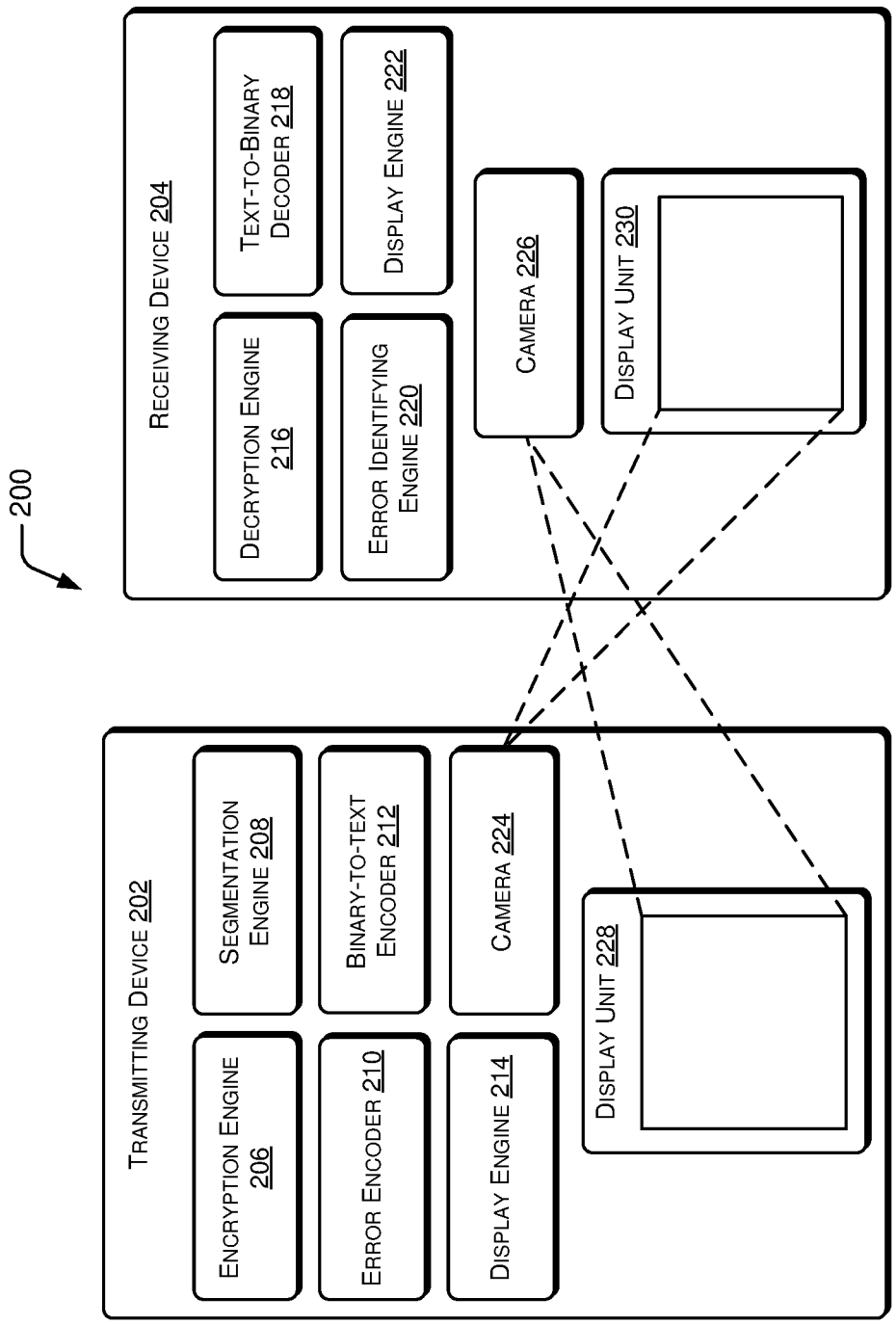
FIG. 2 illustrates a system environment for wireless data communication between a transmitting device and a receiving device, according to an example of the present subject matter.

FIG. 2 illustrates a system environment 200 for wireless data communication between a transmitting device 202 and a receiving device 204, according to an example of the present subject matter. The transmitting device 202 and the receiving device 204 may be similar to the transmitting device 102 and the device 100 of FIG. 1, respectively. As shown in FIG. 2, the transmitting device 202 includes an encryption engine 206, a segmentation engine 208, an error encoder 210, a binary-to-text encoder 212, and a display engine 214. Similarly, the receiving device 204 includes a decryption engine 216, a text-to-binary decoder 218, an error identifying engine 220, and a display engine 222. The encryption engine 206, the segmentation engine 208, the error encoder 210, the binary-to-text encoder 212, and the display engine 214 of the transmitting device 202, and the decryption engine 216, the text-to-binary decoder 218, the error identifying engine 220, and the display engine 222 of the receiving device 204 may collectively be referred to as engine(s) which can be implemented through a combination of any suitable hardware and computer-readable instructions. The engine(s) may be implemented in a number of different ways to perform various functions for the purposes of data communication between transmitting devices and receiving devices in the system environment 200. For example, the computer-readable instructions for the engine(s) may be processor-executable instructions stored in a non-transitory computer-readable storage medium, and the hardware for the engine(s) may include a processing resource (e.g., processor(s)), to execute such instructions. In the present examples, the non-transitory computer-readable storage medium stores instructions which, when executed by the processing resource, implements the engine(s). The transmitting device 202 and the receiving device 204 may include the non-transitory computer-readable storage medium storing the instructions and the processing resource (not shown) to execute the instructions. In an example, the non-transitory computer-readable storage medium storing the instructions may be external, but accessible to the processing resource of the transmitting device 202 and the receiving device 204. In another example, the engine(s) may be implemented by electronic circuitry.

The processing resource of the transmitting device 202 and the receiving device 204 may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium coupled to the processing resource of the transmitting device 202 and the receiving device 204. The non-transitory computer-readable storage medium may include, for example, volatile memory (e.g., RAM), and/or non-volatile memory (e.g., EPROM, flash memory, NVRAM, memristor, etc.).

Further, as shown in FIG. 2, each of the transmitting device 202 and the receiving device 204 includes a camera and a display unit. The camera 224, 226 may include a lens or a combination of lenses and an image sensor, such as a CMOS or a CCD sensor. The cameras 224, 226 may be integral or external to the respective device 202, 204, and may be of a video graphic array (VGA) resolution or of a higher resolution. The display units 228, 230 may include a liquid crystal display (LCD), a light emitting diode (LED) display, an organic light emitting diode (OLED) display, a cathode ray tube (CRT), and such.

The description hereinafter describes a procedure of data communication in the system environment 200 in accordance with an example implementation. Example implementations of the present subject matter are described with reference to the transmitting device 202 and the receiving device 204. The procedure can be implemented in a similar manner for data communication between any two devices, both having a camera and a display unit. Also, a single device may be provided with the functionality of the transmitting device 202 and the receiving device 204, such that the same device may operate to transfer the data or receive the data in accordance with the present subject matter. It may be noted that data to be transferred from the transmitting device 202 to the receiving device 204 is stored in the transmitting device 202 in the form of binary data bits. The data may, for example, include an image, an audio, a video, a text document, and such. Further, the description also references FIG. 3(a) and FIG. 3(b) which, respectively, illustrate an example sequence of conversion of binary data bits to image frames in the transmitting device 202 and an example sequence of conversion of image frames to binary data bits in the receiving device 204.

In an example implementation, the segmentation engine 208 of the transmitting device 202 determines a variety of working parameters which may be utilized for segmenting the binary data bits into bit frames. A bit frame may correspond to rows of bits which are converted into an image frame with text characters for displaying on the display unit 228 of the transmitting device 202. The working parameters may, for example, include: (1) a number of display lines 'L' in the display unit 228 of the transmitting device 202; (2) a size of a display line in the display unit 228; (3) a resolution of the camera 226 of the receiving device 204; (4) a distance between the display unit 228 and the camera 226 for the camera 226 to capture an image frame displayed on the display unit 228; (5) a font size of text characters to be displayed in each of the display lines; and (6) a number of text characters '$N_L$' to be displayed in each of the display lines.

The number of display lines L and the size of the display line may be determined from an interface function of the display unit 228. The values of the resolution of the camera 226 and the distance between the display unit 228 and the camera 226 may be provided by a user of the transmitting device 202. The font size of the text characters to be displayed in a display line may be determined based on the resolution of the camera 226. The font size may also depend on the distance between the display unit 228 and the camera 226. The transmitting device 202 may store a table which provides a mapping of font size with respect to camera resolution and camera distance from the display unit. Further, the number of text characters $N_L$ may be determined based on the font size and the size of the display line.

In an example implementation, the working parameters may also include a binary-to-text conversion ratio 'A' indicative of a number of data bits to be converted to a text character. The binary-to-text conversion ratio A may be determined based on a text mapping table stored and utilized in the transmitting device 202 for conversion of binary data bits to text characters. In particular, the binary-to-text conversion ratio A is indicated by the size of bit-patterns which are mapped to text characters in the text mapping table. In an example implementation, the text mapping table may include mapping of bit-patterns to 7-bit ASCII characters, where each combination of 7 bits is mapped to a unique ASCII character. For such a text mapping table, the binary-to-text conversion ratio A is determined to be 7.

In an example implementation, the transmitting device 202 may store a plurality of text mapping tables, each providing a mapping of bit-patterns of a specific size to text characters. For example, a text mapping table that maps 5 bit bit-patterns to 32 different text characters, another text mapping table that maps 6 bit bit-patterns to 64 different text characters, and so on. The segmentation engine 208 may prompt a user to select and provide an input for the text mapping table to be used for conversion, and accordingly determine the binary-to-text conversion ratio A. In an example implementation, the binary-to-text conversion ratio A may be automatically set and determined by the segmentation engine 208.

In an example implementation, the working parameters may also include a binary-to-color conversion ratio 'B' indicative of a number of data bits to be converted to a color of the text character. The binary-to-color conversion ratio B may depend on a color mapping table utilized for color coding the text characters. In particular, the binary-to-color conversion ratio in indicated by the size of bit-patterns which are mapped to different colors in the color mapping table. In an example implementation, the color mapping table may include mapping of 3 bit bit-patterns to 8 colors, where a unique color corresponds to a unique combination of 3 bits. For such a color mapping table, the binary-to-color conversion ratio B is 3. It may be noted that the segmentation engine 208 may determine whether the camera 226 of the receiving device 204 is a colored camera, i.e., it can capture colors distinctly. The segmentation engine 208 may determine this based on user inputs. If the camera 226 is not a colored camera, then the binary-to-color conversion ratio B is determined to be 0.

In an example implementation, the transmitting device 202 may store a plurality of color mapping tables, each providing a mapping of bit-patterns of a specific size to colors. For example, a color mapping table that maps 2 bit bit-patterns to 4 different colors, another text mapping table that maps 3 bit bit-patterns to 8 different text characters, and so on. The segmentation engine 208 may prompt a user to provide an input for the color mapping table to be used for color coding based on the number of colors that the camera 226 can support, and accordingly determine the binary-to-color conversion ratio B. In an example implementation, the binary-to-color conversion ratio B may be automatically set and determined by the segmentation engine 208.

In an example implementation, a number of text characters, out of $N_L$, in each display line may be reserved for checking error in reception of the text characters associated with respective display line. Such text characters may be referred to as error-check text characters. The segmentation engine 208 may thus determine, as a working parameter, a number of error-check text characters '$N_E$' to be displayed in each display line of the display unit 228. The number of error-check text characters $N_E$ may depend on the resolution of the camera 226 and the distance between the camera 226 and the display unit 228 for capturing image frames. In an example, the number $N_E$ is inversely proportional to the resolution of the camera 226 and directly proportional to the distance between the camera 226 and the display unit 228. The number of error-check text characters $N_E$ may be provided by a user or set automatically. It may be noted that if $N_E$ number of text characters are reserved for error checking, then $N_L$ minus $N_E$ ($=N_D$) number of text characters remain for representing the binary data bits.

The working parameters may be determined dynamically before transferring data from a transmitting device to a receiving device. This facilitates in generating image frames from binary data bits associated with the data for efficient transfer of data from the transmitting device to the receiving device.

In an example implementation, prior to segmentation of the binary data bits into bit frames, the encryption engine 206 may encrypt the binary data bits using an encryption key. The encryption key may be a bit sequence of length of K bits. K may be, for example, 8, 16, 32, 64, or 128. For encryption, in an example, the binary data bits are divided into blocks of K bits, and each of the blocks is XORed with the encryption key to obtain the encrypted binary data bits. The encrypted binary data bits may then be segmented into bit frames. It may be noted that if the binary data bits is not an integer multiple of K, then the binary data bits may be padded with P number of 0's to make it an integer multiple of K. After encrypting the padded binary data bits using the encryption key, last P number of bits may be ignored to obtain the encryption binary data bits.

Figure 3A:
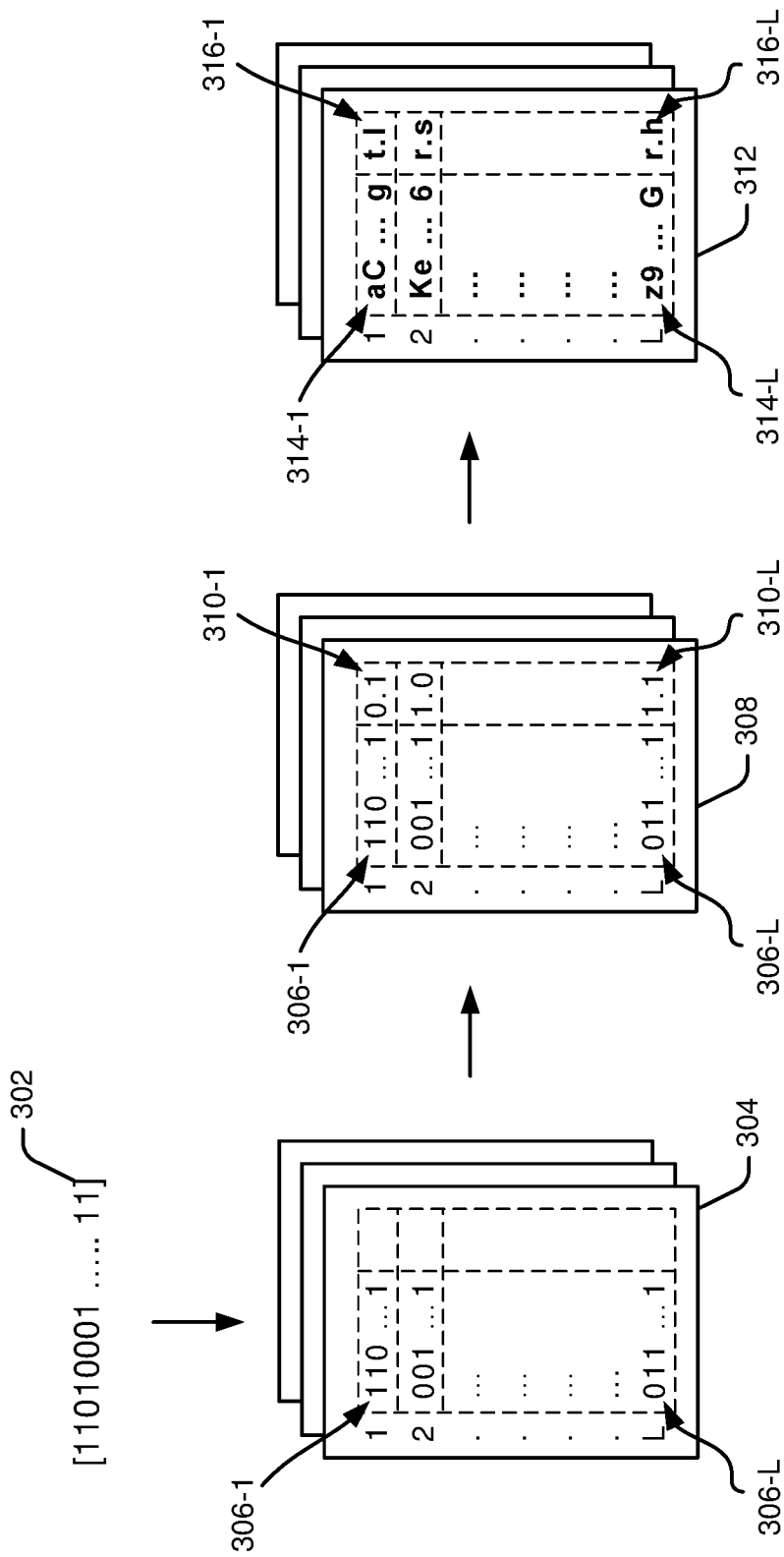
FIG. 3(a) illustrates an example sequence of conversion of binary data bits to image frames in the transmitting device.

After the working parameters are determined and the binary data bits are encrypted, the segmentation engine 208 segments the binary data bits into bit frames. The binary data bits are line-wise segmented in the bit frames, such that each bit frame has L number of lines, with each line of the respective bit frame having $(A+B)*(N_L-N_E)$ number of binary data bits. FIG. 3(a) shows binary data bits 302 segmented into bit frames 304. Each bit frame, as shown in the first bit frame on top, has L lines, with each line having $(A+B)*(N_L-N_E)$ number of binary data bits 306-1, . . . , 306-L. It may be noted that the last bit frame may have less than L filled lines, and the last filled line of the last bit frame may have less than $(A+B)*(N_L-N_E)$ number of binary data bits. In case the last filled line of the last bit frame has less than $(A+B)*(N_L-N_E)$ number of binary data bits, then Q number of 0's may be padded to make the number of binary data bits equal to $(A+B)*(N_L-N_E)$. The value of Q is stored in the transmitting device 202 and may be provided to the receiving device 204 for processing therein.

After the binary data bits are segmented into the bit frames, the error encoder 210 generates error encoding bits for each line of each bit frame. In an example implementation, the error encoder 210 may process binary data bits in each line based on a block coding technique and generate $(A+B)*N_E$ number of error encoding bits for the respective line. The error encoder 210 then appends $(A+B)*N_E$ number of error encoding bits to the binary data bits of that line to update the bit frame. FIG. 3(a) shows an updated bit frame 308, where each line of the bit frame 308 is appended with $(A+B)*N_E$ number of error encoding bits 310-1, . . . , 310-L.

After the error encoding bits are generated and appended, the binary-to-text encoder 212 encodes the binary data bits in each of the bit frames to text characters and generates an image frame corresponding to the respective bit frame. The binary-to-text encoder 212 also encodes the error encoding bits in each of the bit frames to text characters, referred to as error-check text characters, in the corresponding image frame. The encoding of bits may be based on a text mapping table. Further, the text characters, including the error-check text characters, may be color coded based on a color mapping table.

For encoding of bits in a line of a bit frame to text characters, the bits are divided into blocks of (A+B) number of bits. For each of the blocks of (A+B) number of bits, A number of bits are encoded to a corresponding text character as per the text mapping table, and B number of bits are considered for coloring that text character as per the color mapping table. The same procedure is performed for encoding of the binary data bits to the text characters and encoding the error correction bits to the error-check text characters. FIG. 3(a) shows an image frame 312 corresponding to the bit frame 308. Each line of the image frame 312 includes $(N_L-N_E)$ number of text characters 314-1, . . . , 314-L obtained by encoding the binary data bits associated with the data to be transferred, and includes $N_E$ number of error-check text characters 316-1, . . . , 316-L obtained by encoding the error encoding bits. Thus, the image frame 312 has $N_L$ number of text characters in each of its lines.

Further, the display engine 214 displays each of the image frames on the display unit 228. The image frames may be displayed sequentially, where a line of an image frame is displayed over a display line of the display unit 228.

For capturing the image frames, the receiving device 204 is positioned such that the camera 226 faces the display unit 228 of the transmitting device 202. The camera 226 accordingly captures each of the image frames displayed on the display unit 228. The image frames may be sequentially captured by the camera 226 and processed by the receiving device 204 for obtaining the binary data bits associated with the data. In an example implementation, each image frame is processed prior to capturing a subsequent image frame. In an example implementation, processing is performed after capturing all the image frames.

In an example implementation, the transmitting device 202 may provide the values of A, B, $N_L$, $N_E$, and Q to the receiving device 204 for processing the captured image frames. The receiving device 204 may receive and store the values of A, B, $N_L$, $N_E$, and Q. The receiving device 204 also stores the text mapping table and the color mapping table based on which the binary data bits are encoded in the transmitting device 202. The receiving device 204 may also store the encryption key based on which the binary data bits are encrypted in the transmitting device 202.

Figure 3B:
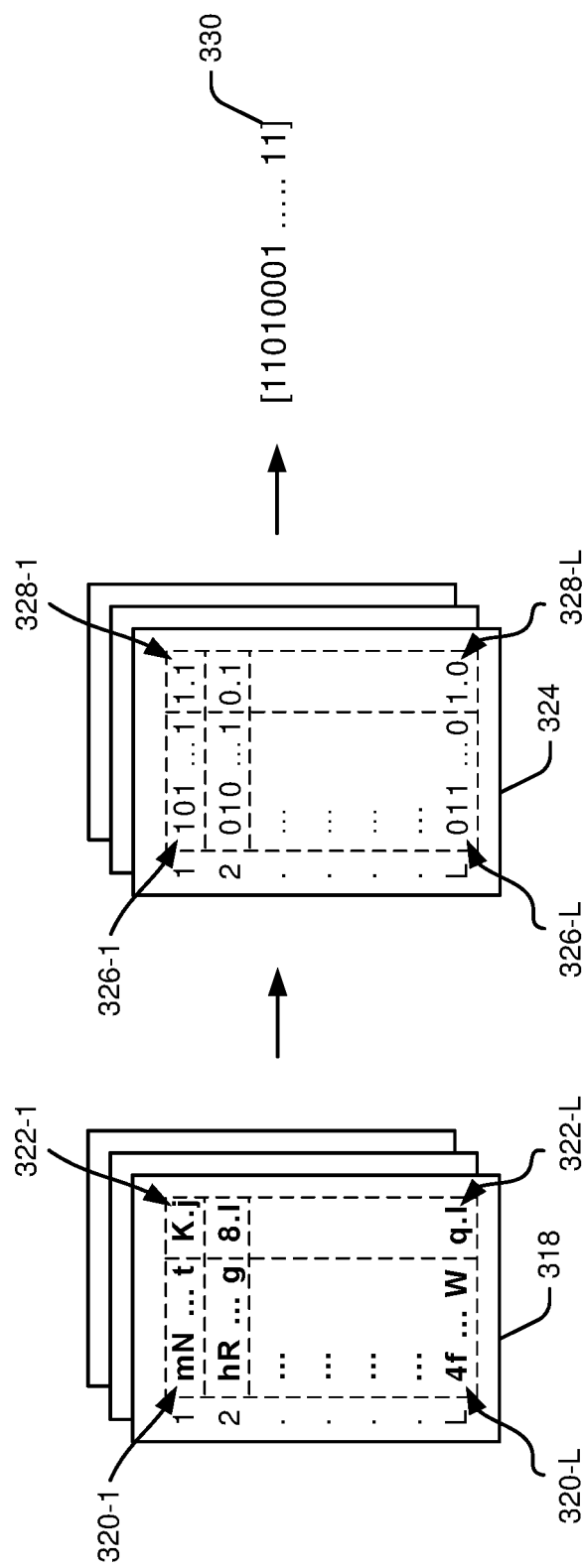
FIG. 3(b) illustrates an example sequence of conversion of image frames to binary data bits in the receiving device.

For a captured image frame, the text-to-binary decoder 218 of the receiving device 204 decodes the text characters in the image frame to bits in a corresponding bit frame based on the text mapping table. The bits in the bit frame include binary data bits obtained by decoding the text characters associated with the binary data bits, and error encoding bits obtained by decoding the error-check text characters. In case the text characters, including the error-check text characters, are colored, the color of each text character is decoded to bits based on the color mapping table. For example, a colored text character is decoded to (A+B) number of bits, where A bits are obtained by decoding the text character as such based on the text mapping table, and B bits are obtained by decoding the color of the text characters based on the color mapping table. In an example implementation, the text-to-binary decoder 218 may utilize a maximum likelihood detection mechanism for identifying a text character before decoding. In the maximum likelihood detection mechanism, the text character is compared with possible characters and the possible character with the highest matching is selected to be the text character. FIG. 3(b) shows a captured image frame 318 with L lines, and each line having text characters 320-1, . . . , 320-L associated with the binary data bits for the data being transferred and error-check text characters 322-1, . . . , 322-L. FIG. 3(b) also shows a bit frame 324 corresponding to the image frame 318 and having the binary data bits 326-1, ..., 326-L and the error encoding bits 328-1, ..., 328-L.

It may be noted that the text characters in some lines of the image frame may not be captured correctly by the camera 226 of the receiving device 204 for a variety of reasons. The reasons may, for example, include low brightness of the display unit 228, obstacle in the vision of the camera 226, incorrect reading by the camera, and such.

In an example implementation, the error identifying engine 220 determines erroneously received lines of the captured image frame based on processing of the error-check text characters in a respective line. For example, the error identifying engine 220 may process the binary data bits in each line of the corresponding bit frame based on a block coding technique and generate a set of $(A+B)*N_E$ number of bits for the respective line. The error identifying engine 220 may compare the set of bits with the error encoding bits in the line to determine whether the text characters of the corresponding line in the image frame are captured or received without an error or not. If the set of bits for a line does not match the error encoding bits in the line, then the error identifying engine 220 determines that line as an erroneously received line.

In case the lines of the image frames are captured correctly, the text-to-binary decoder 218 concatenates the binary data bits of the lines of the corresponding bit frames to obtain a sequence of bits which corresponds to the binary data bits associated with the data being transferred. FIG. 3(b) shows the sequence of bits 330 obtained by concatenating the binary data bits 326-1, ..., 326-L for all the bit frames.

In case lines of an image frame are determined to be erroneously received, the error identifying engine 220 provides an identifier associated with each of the erroneously received lines to the transmitting device 202 so that the erroneously received lines can be retransmitted. The identifier for an erroneously received line may be a line number. In an example implementation, the display engine 222 of the receiving device 204 displays identifiers of the erroneously received lines on the display unit 230. Like for the transmitting device 202, the receiving device 204 may also determine the resolution of the camera 224 of the receiving device 204 and the distance between the display unit 230 and the camera 224 to capture an image displayed on the display unit 230. The display engine 222 may accordingly determine the font size of identifiers of the erroneously received lines for displaying on the display unit 230.

In an example implementation, the camera 224 of the receiving device 204 captures identifiers of the erroneously received lines and the display engine 214 may accordingly re-display the text characters, including the error-check text characters, associated with the erroneously received lines on the display unit 228. The camera 226 of the transmitting device 202 captures the text characters of the erroneously received lines displayed on the display unit 228, and the text-to-binary decoder 218 decodes the captured text characters to bits and accordingly updates the bit frame. A similar procedure may be performed with respect to each bit frames, before the text-to-binary decoder 218 concatenates the binary data bits of the lines of the all bit frames to obtain the binary data bits associated with the data being transferred.

In an example implementation, the concatenated binary data bits may include Q number of 0's in the end, corresponding to the 0's padded before segmenting the binary data bits in the transmitting device 202. The Q number of 0's from the end of the concatenated binary data bits may thus be deleted.

Further, in case the binary data bits are encrypted in the transmitting device 202, the decryption engine 216 of the receiving device 204 decrypts the concatenated binary data bits using the encryption key. The binary data bits may be decrypted in a manner similar to that followed for the encryption of binary data bits in the transmitting device 202.

Figure 4:
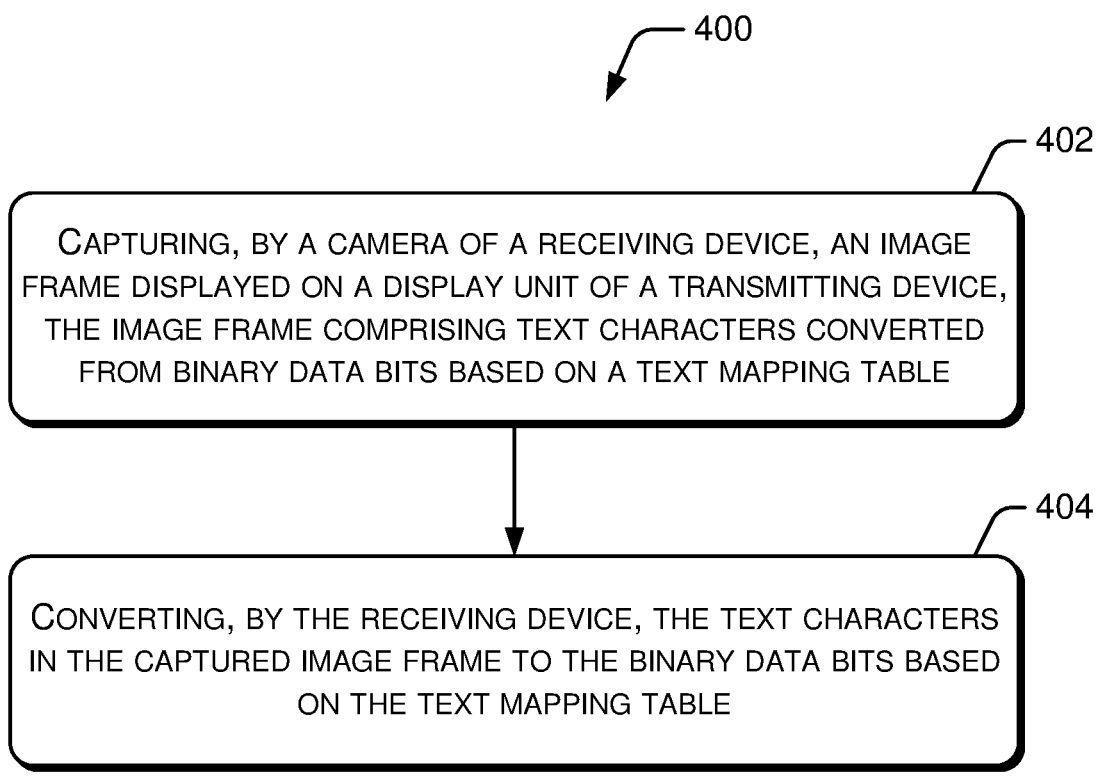
FIG. 4 illustrates a method of wireless data communication, according to an example of the present subject matter.

FIG. 4 illustrates a method 400 of wireless data communication, according to an example of the present subject matter. The method 400 can be implemented by processor(s) or device(s) through any suitable hardware, a non-transitory machine readable medium, or a combination thereof. Further, although the method 400 is described in context of the aforementioned devices 202 and 204, other suitable devices or systems may be used for execution of the method 400. It may be understood that processes involved in the method 400 can be executed based on instructions stored in a non-transitory computer-readable medium, as will be readily understood. The non-transitory computer-readable medium may include, for example, digital memories, magnetic storage media, such as a magnetic disks and magnetic tapes, hard drives, or optically readable digital data storage media.

Referring to FIG. 4, at block 402, an image frame displayed on a display unit 228 of the transmitting device 202 is captured by a camera 226 of the receiving device 204. The image frame includes text characters converted from binary data bits based on a text mapping table in the transmitting device 202. The binary data bits are associated with the data to be transferred from the transmitting device 202 to the receiving device 204.

At block 404, the text characters in the captured image frame are converted, by the receiving device 204, to the binary data bits based on the text mapping table. In this matter, the binary data bits, and thus the data, are wirelessly transferred to from the transmitting device 202 to the receiving device 204, without using any RF or IR transmitters or receivers.

Figure 5A:
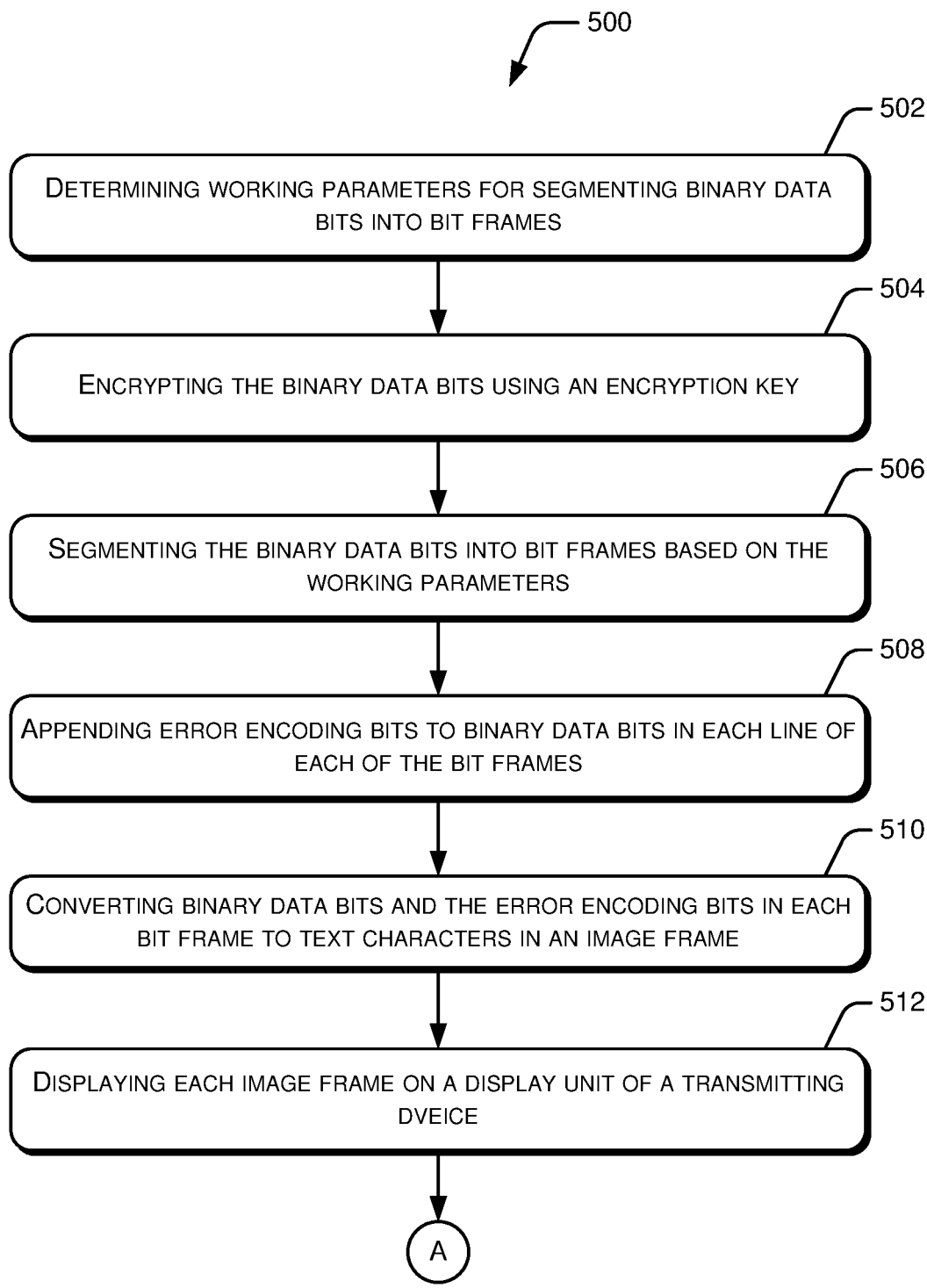
FIGS. 5(a)-5(b) illustrate a method of wireless data communication, according to an example of the present subject matter.
Figure 5B:
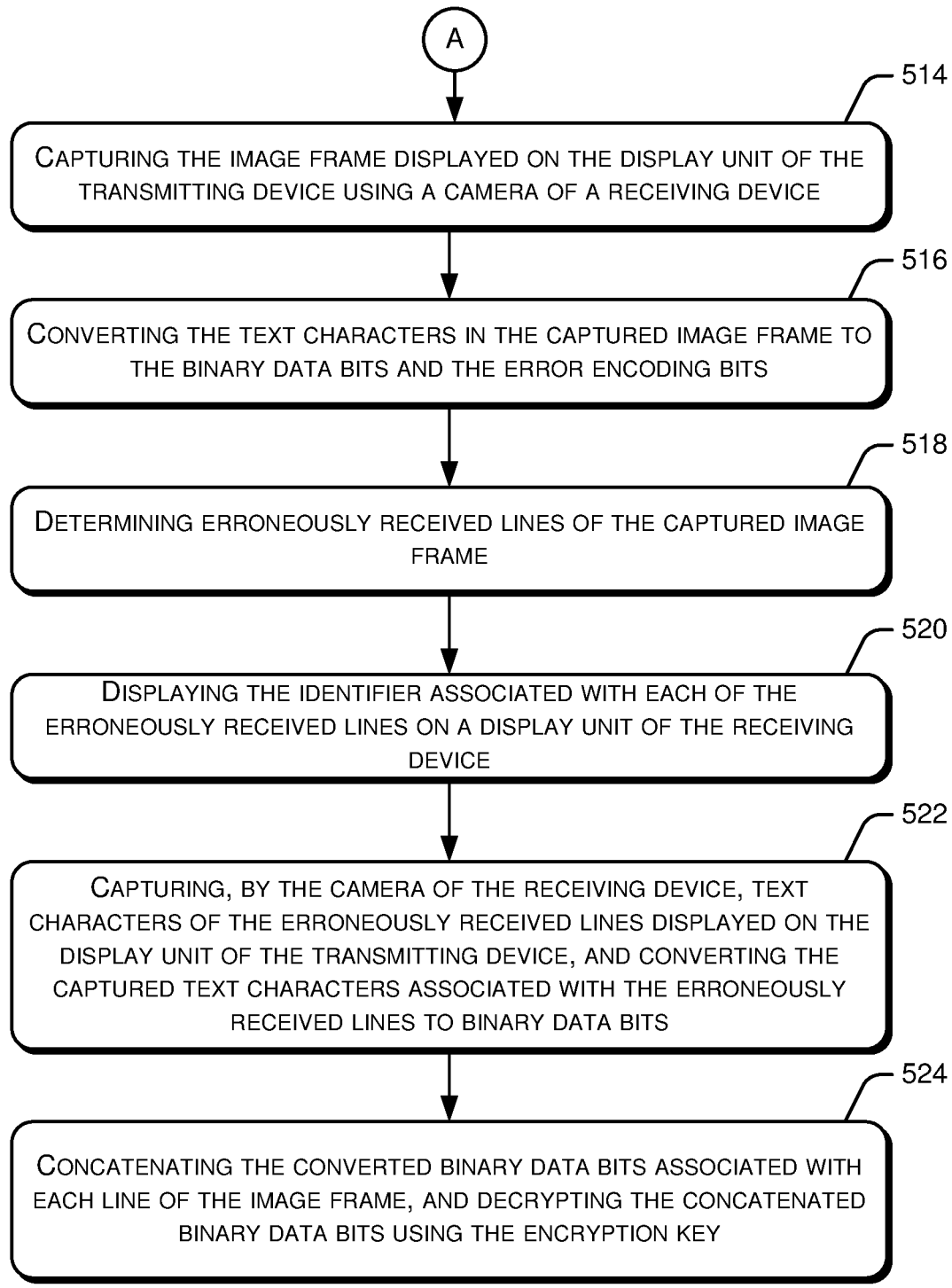

FIGS. 5(a)-5(b) illustrate a method 500 of wireless data communication, according to an example of the present subject matter. The method 500 can be implemented by processor(s) or computing system(s) through any suitable hardware, a non-transitory machine readable medium, or a combination thereof. Further, although the method 500 is described in context of the aforementioned devices 202 and 204, other suitable computing devices or systems may be used for execution of the method 500. It may be understood that processes involved in the method 500 can be executed based on instructions stored in a non-transitory computer-readable medium, as will be readily understood. The non-transitory computer-readable medium may include, for example, digital memories, magnetic storage media, such as a magnetic disks and magnetic tapes, hard drives, or optically readable digital data storage media.

Referring to FIG. 5(a), at block 502, working parameters are determined by the transmitting device 202 for segmenting binary data bits into bit frames. The working parameters may, for example, include: (1) a number of display lines in the display unit 228 of the transmitting device 202; (2) a size of a display line in the display unit 228; (3) a resolution of the camera 226 of the receiving device 204; (4) a distance between the display unit 228 and the camera 226 for the camera 226 to capture an image frame displayed on the display unit 228; (5) a font size of text characters to be displayed in each of the display lines; (6) a number of text characters '$N_L$' to be displayed in each of the display lines;

(7) a binary-to-text conversion ratio 'A' indicative of a number of data bits to be converted to a text character; (8) a binary-to-color conversion ratio 'B' indicative of a number of data bits to be converted to a color of the text character; and (9) a number of error-check text characters '$N_E$' to be displayed in each display line of the display unit 228, as described earlier.

At block 504, the binary data bits are encrypted using an encryption key by the transmitting device 202. The encryption may be performed in a manner as described earlier. At block 506, the binary data bits are segmented into bit frames based on the working parameters by the transmitting device 202. The binary data bits may be segmented as described earlier based on the binary-to-text conversion ratio A, the binary-to-color conversion ratio B, the number of text characters $N_L$ to be displayed in the each display line, and the number of display lines L.

At block 508, error encoding bits are appended to binary data bits in each line of each of the bit frames by the transmitting device 202 based on the number of error-check text characters $N_E$. As described earlier, $(A+B)*N_E$ number of error encoding bits may be obtained for each line by processing the binary data bits for a respective line based on a block coding technique.

At block 510, the binary data bits and the error encoding bits in each of the bit frames are converted to text characters in an image frame by the transmitting device 202 based on the text mapping table. The text characters obtained based on conversion of the error encoding bits may be referred to as the error-check text characters. In an example implementation, the text characters may be ASCII characters. In an example implementation, the text characters, including the error-check text characters, may be color coded based on a color mapping table. A procedure of converting binary data bits to colored text characters is described earlier in the description. At block 512, each image frame with the text characters is displayed on the display unit 228 of the transmitting device 202.

Referring to FIG. 5(b), at block 514, the image frame displayed on the display unit 228 of the transmitting device 202 is captured by a camera 226 of the receiving device 204. Upon capturing the image frame, the text characters in the captured image frame are converted to binary data bits by the receiving device 204 based on the text mapping table, at block 516. In case the text characters are color coded, a color of each of the text characters is decoded to a number of bits in the binary data bits based on the color mapping table.

The conversion of text characters to binary data bits includes processing of the error-check text characters in each line of the image frame for determining erroneously received lines of the image frame based on the processing. At block 518, erroneously received lines of the captured image frame are determined based on processing of the error-check text characters in a respective line. The processing of the error-check text characters includes conversion of the error-check text characters in each line of the image frame to error encoding bits using the text mapping table. The binary data bits of each line is process based on a block coding technique to obtain a set of bit, which are compared with the error encoding bits in the respective line to determine whether the line is erroneously received.

After determining the erroneously received lines, an identifier associated with each of the erroneously received lines is displayed on a display unit 230 of the receiving device 204, at block 520. The identifier for a line may be a line number of the line. Identifiers of the erroneously received lines are captured by the camera 224 of the transmitting device 202, and accordingly the erroneously received lines are re-displayed on the display unit 228 of the transmitting device 202.

At block 522, text characters of the erroneously received lines displayed on the display unit 228 of the transmitting device 202 are captured by the camera 226 of the receiving device 204, and the captured text characters associated with the erroneously received lines are converted to binary data bits by the receiving device 204. At block 524, the converted binary data bits associated with each line of the image frame are concatenated, and the concatenated binary data bits are decrypted using the encryption key by the receiving device 204.

Figure 6:
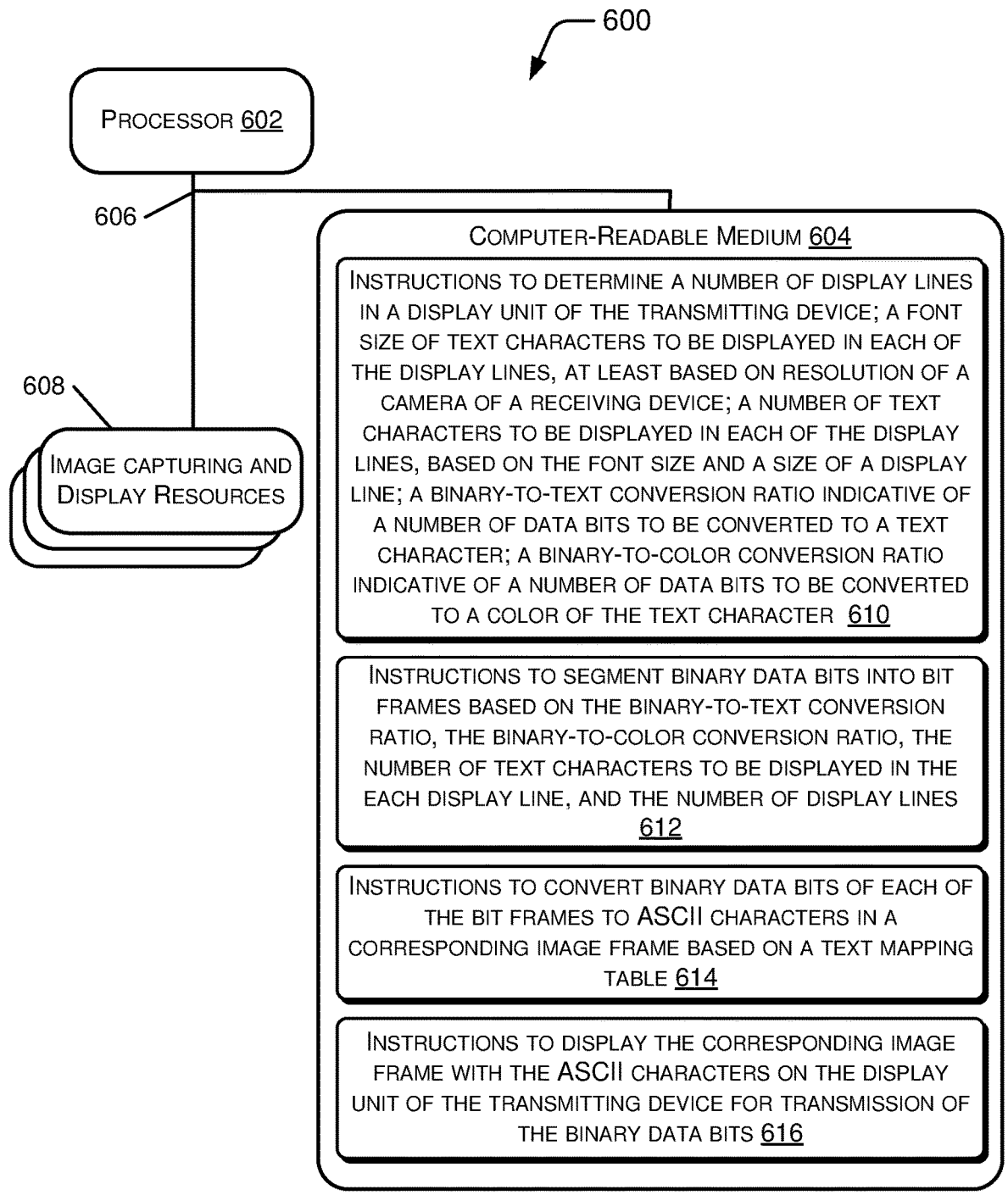
FIG. 6 illustrates a system environment implementing a non-transitory computer readable medium for wireless data communication between devices, according to an example of the present subject matter.

FIG. 6 illustrates a system environment 600 implementing a non-transitory computer readable medium 604 for wireless data communication between devices, according to an example of the present subject matter. The system environment 600 includes a processor 602 communicatively coupled to the non-transitory computer-readable medium 604 through a communication link 606. In an example, the processor 602 may be a processing resource of the transmitting device 202 for fetching and executing computer-readable instructions from the non-transitory computer-readable medium 604.

The non-transitory computer-readable medium 604 can be, for example, an internal memory device or an external memory device. In an example implementation, the communication link 606 may be a direct communication link, such as any memory read/write interface. In another example implementation, the communication link 606 may be an indirect communication link, such as a network interface. In such a case, the processor 602 can access the non-transitory computer-readable medium 604 through a communication network (not shown).

The processor 602 and the non-transitory computer-readable medium 604 may also be communicatively coupled to image capturing and display resources 608. The image capturing and display resources 608 may include a camera and a display unit. In an example implementation, the non-transitory computer-readable medium 604 includes a set of computer-readable instructions for wireless data communication. The set of computer-readable instructions can be accessed by the processor 602 through the communication link 606 and subsequently executed to perform acts for wireless data communication.

Referring to FIG. 6, in an example, the non-transitory computer-readable medium 604 may include instructions 610 to determine a number of display lines L in a display unit of the transmitting device 202; determine a font size of text characters to be displayed in each of the display lines, at least based on resolution of a camera of a receiving device 204; determine a number of text characters $N_L$ to be displayed in each of the display lines, based on the font size and a size of a display line; determine a binary-to-text conversion ratio A indicative of a number of data bits to be converted to a text character; and determine a binary-to-color conversion ratio B indicative of a number of data bits to be converted to a color of the text character. The non-transitory computer-readable medium 604 may also include instructions to determine a number of error-check text characters $N_E$ to be displayed in each display line of the display unit.

The non-transitory computer-readable medium 604 may include instructions 612 to segment binary data bits into bit frames based on the binary-to-text conversion ratio, the binary-to-color conversion ratio, the number of text characters to be displayed in the each display line, and the number of display lines. The non-transitory computer-readable medium 604 may include instructions 614 to convert binary data bits of each of the bit frames to ASCII characters in a corresponding image frame based on a text mapping table. The non-transitory computer-readable medium 604 may include instructions 616 to display the corresponding image frame with the ASCII characters on the display unit of the transmitting device 202 for transmission of the binary data bits. In an example implementation, the non-transitory computer-readable medium 604 may include instructions to convert binary data bits of each of the bit frames to colored ASCII characters in a corresponding image frame based on a text mapping table and a color mapping table.

Further, in an example implementation, the non-transitory computer-readable medium 604 may include instructions to append error encoding bits to binary data bits in each line of each of the bit frames based on the number of error-check text characters, and convert the error encoding bits to text characters in the corresponding image frame based on the text mapping table.

Further, in an example implementation, the non-transitory computer-readable medium 604 may include instructions to capture, using a camera of the transmitting device 202, identifiers associated with erroneous lines of an image frame received in the receiving device 204. The identifiers may include line numbers. The erroneous lines are identified in the receiving device 204 based on processing the text characters in a respective line. The identifiers are displayed on a display unit of the receiving device 204. The non-transitory computer-readable medium 604 may include instructions to re-display the text characters associated with the erroneous lines on the display unit of the transmitting device 202 for re-capturing by the receiving device 204.

Although examples for the present disclosure have been described in language specific to structural features and/or methods, it is to be understood that the appended claims are not limited to the specific features or methods described herein. Rather, the specific features and methods are disclosed and explained as examples of the present disclosure.

We claim:

1. A method of wireless data communication, comprising:
    capturing, by a camera of a receiving device, an image frame displayed on a display unit of a transmitting device, the image frame comprising text characters converted from binary data bits based on a text mapping table; and
    converting, by the receiving device, the text characters in the captured image frame to the binary data bits based on the text mapping table, wherein the text characters in the captured image frame comprise error-check text characters corresponding to error encoding bits.

2. The method as claimed in claim 1, wherein the text characters are color coded, wherein the converting the text characters to the binary data bits comprises:
    decoding, by the receiving device, a color of each of the text characters to a number of bits in the binary data bits, based on a color mapping table.

3. The method as claimed in claim 1, wherein the text characters are ASCII characters.

4. The method as claimed in claim 1, wherein the converting the text characters to the binary data bits comprises:
    determining, by the receiving device, erroneously received lines of the captured image frame based on processing of the error-check text characters in a respective line; and
    providing, by the receiving device, an identifier associated with each of the erroneously received lines to the transmitting device for retransmission of the erroneously received lines.

5. The method as claimed in claim 4, wherein the providing the identifier comprises:
    displaying the identifier associated with each of the erroneously received lines on a display unit of the receiving device.

6. The method as claimed in claim 4, further comprising:
    capturing, by the camera of the receiving device, text characters of the erroneously received lines displayed on the display unit of the transmitting device; and
    converting, by the receiving device, the captured text characters associated with the erroneously received lines to binary data bits.

7. The method as claimed in claim 1, wherein the binary data bits are encrypted, using an encryption key, prior to converting to the text characters in the transmitting device, wherein the method further comprises:
    concatenating, by the receiving device, the converted binary data bits associated with each line of the image frame; and
    decrypting, by the receiving device, the concatenated binary data bits using the encryption key.

8. The method as claimed in claim 1, further comprising:
    determining by the transmitting device:
        a number of display lines in the display unit of the transmitting device;
        a font size of text characters to be displayed in each of the display lines, at least based on resolution of the camera of the receiving device;
        a number of text characters to be displayed in each of the display lines, based on the determined font size and a size of a display line;
        a binary-to-text conversion ratio indicative of a number of data bits to be converted to a text character;
        a binary-to-color conversion ratio indicative of a number of data bits to be converted to a color of the text character;
    segmenting, by the transmitting device, the binary data bits into bit frames based on the binary-to-text conversion ratio, the binary-to-color conversion ratio, the number of text characters to be displayed in the each display line, and the number of display lines; and
    converting, by the transmitting device, binary data bits in each of the bit frames to text characters in an image frame based on the text mapping table for displaying on the display unit of the transmitting device.

9. The method as claimed in claim 8, further comprises:
    determining, by the transmitting device, a number of error-check text characters to be displayed in the each display line;
    appending, by the transmitting device, error encoding bits to binary data bits in each line of each of the bit frames based on the number of error-check text characters; and
    converting, by the transmitting device, the error encoding bits to error-check text characters based on the text mapping table.

10. A device for wireless data communication, comprising:
    a camera to capture an image frame including colored text characters displayed on a display unit of a transmitting device, each of the colored text characters being encoded from binary data bits based on a text mapping table and a color mapping table, wherein the colored text characters in each line of the captured image frame comprises colored error-check text characters corresponding to error encoding bits; and a text-to-binary decoder to decode the colored text characters in the captured image frame to the binary data bits based on the text mapping table and the color mapping table.

11. The device as claimed in claim 10, wherein the colored text characters are colored ASCII characters.

12. The device as claimed in claim 10, wherein the device comprises:

an error identifying engine to determine erroneously received lines of the captured image frame based on processing of the colored error-check text characters in a respective line; and a display engine to display an identifier associated with each of the erroneously received lines on a display unit of the device for retransmission of the erroneously received lines by the transmitting device.

13. The device as claimed in claim 12, wherein:

the camera is to capture colored text characters of the erroneously received lines displayed on the display unit of the transmitting device; and the text-to-binary decoder is to decode the captured colored text characters associated with the erroneously received lines to binary data bits based on the text mapping table and the color mapping table.

14. A non-transitory computer-readable medium comprising computer-readable instructions, which, when executed by a processor of a transmitting device for wireless data communication, cause the processor to:

determine a number of display lines in a display unit of the transmitting device;

determine a font size of text characters to be displayed in each of the display lines, at least based on resolution of a camera of a receiving device;

determine a number of text characters to be displayed in each of the display lines, based on the font size and a size of a display line;

determine a binary-to-text conversion ratio indicative of a number of data bits to be converted to a text character;

determine a binary-to-color conversion ratio indicative of a number of data bits to be converted to a color of the text character;

segment binary data bits into bit frames based on the binary-to-text conversion ratio, the binary-to-color conversion ratio, the number of text characters to be displayed in the each display line, and the number of display lines;

convert binary data bits of each of the bit frames to ASCII characters in a corresponding image frame based on a text mapping table and a color mapping table; and display the corresponding image frame with the ASCII characters on the display unit of the transmitting device for transmission of the binary data bits.

15. The non-transitory computer-readable medium as claimed in claim 14, wherein the instructions which, when executed by the processor, cause the processor to:

determine a number of text characters corresponding to error encoding to be displayed in the each display line;

append error encoding bits to binary data bits in each line of each of the bit frames based on a number of error-check text characters;

convert the error encoding bits to text characters in the corresponding image frame based on the text mapping table;

capture, using a camera of the transmitting device, identifiers associated with erroneous lines of an image frame received in the receiving device, wherein the erroneous lines are identified in the receiving device based on processing the text characters in a respective line, and wherein the identifiers are displayed on a display unit of the receiving device; and re-display the text characters associated with the erroneous lines on the display unit of the transmitting device for re-capturing by the receive device.

* * * * *